Nov. 4, 1930.  T. R. WARREN  1,780,691
AUTOMATIC CONTROL OF TURBO-ALTERNATORS
Filed June 14, 1929
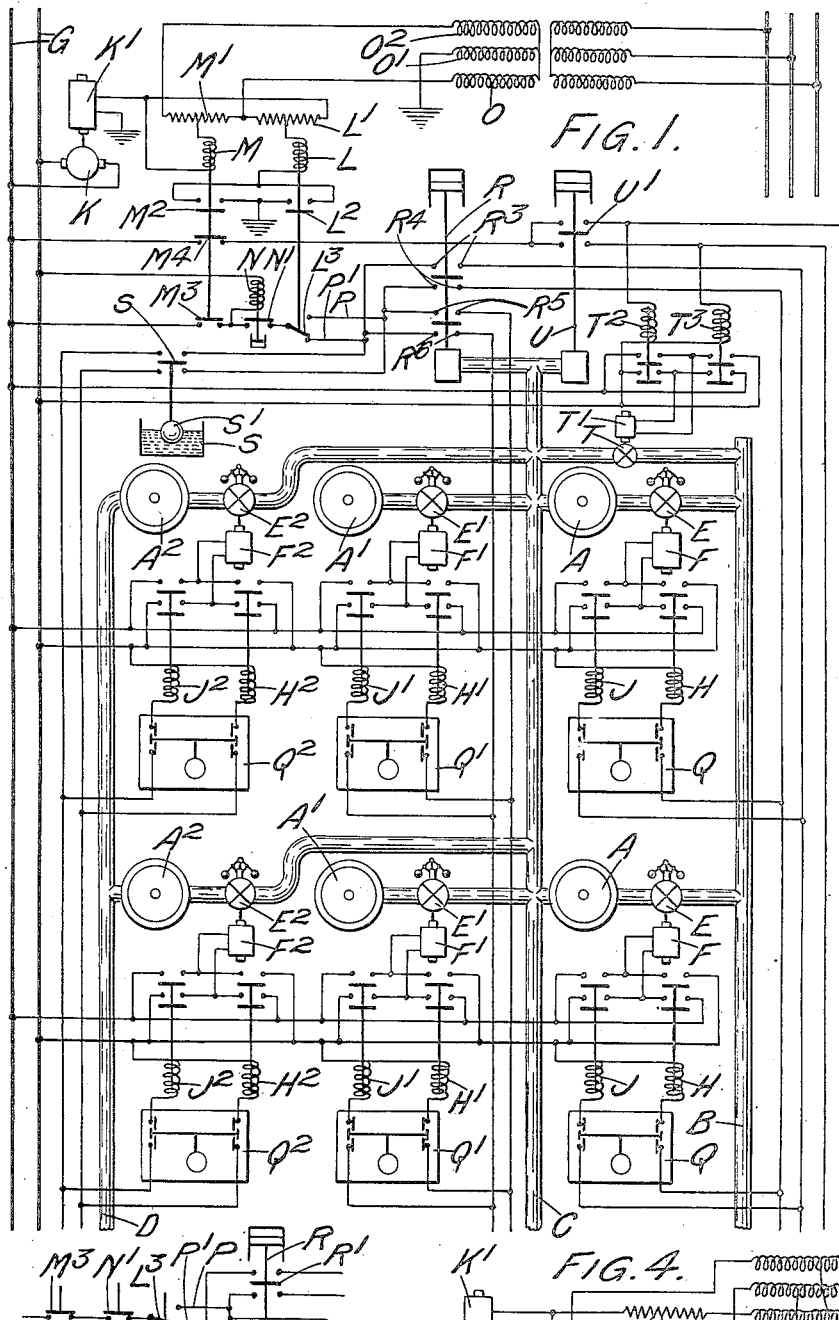
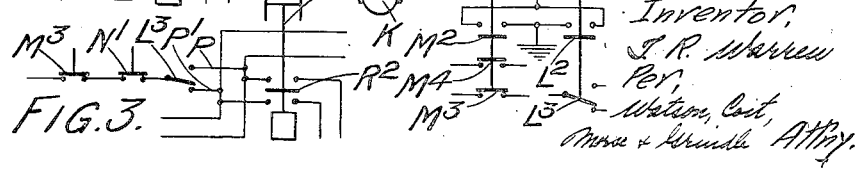

Patented Nov. 4, 1930

1,780,691

UNITED STATES PATENT OFFICE

THOMAS REGINALD WARREN, OF NORTON-ON-TEES, ENGLAND, ASSIGNOR TO IMPERIAL CHEMICAL INDUSTRIES LIMITED, OF LONDON, ENGLAND, A COMPANY OF GREAT BRITAIN

AUTOMATIC CONTROL OF TURBOALTERNATORS

Application filed June 14, 1929, Serial No. 370,979, and in Great Britain June 29, 1928.

This invention relates to the automatic control of groups of alternators driven by turbines operating at different working pressures. Such mixed pressure systems may consist of a group of "primary" alternators driven by high pressure turbines exhausting into an intermediate pressure receiver, and a group of "secondary" alternators driven by turbines supplied from the intermediate pressure receiver.

In such systems it is often desired to utilize the working fluid from the intermediate receiver for auxiliary purposes, and the present invention has for its primary object so to control the machines as to maintain the pressure in the intermediate receiver at the desired value without interfering with the proper supply to the electrical system.

In the mixed pressure system according to the invention means are provided whereby the distribution of the electrical load between the machines of the primary group and those of the secondary group is controlled in accordance with variations in the pressure in the intermediate receiver. Conveniently the distribution of load between the groups of machines is also controlled in accordance with variations in the frequency of the electrical system supplied by the alternators. Means may also be provided for automatically sharing the load between the individual machines of the primary group and between the individual machines of the secondary group.

Thus the supply of steam or other operating fluid to each turbine may be governed by a reversible motor, the direction of supply of energizing current to the governor motors being controlled by contacts on a pressure regulator operated in accordance with the pressure in the intermediate receiver. The supply of energizing current to the governor motors is preferably intermittently interrupted, the extent of such interruptions being dependent on the variation of the system frequency from a standard value.

In order to ensure the maintenance of the desired intermediate pressure when the number of available turbines in the primary group is insufficient to do so, by-pass valves may be provided between the intermediate pressure receiver and the high pressure supply to the primary turbines, such valves being opened automatically when the intermediate pressure falls below a predetermined value.

The exhaust steam from one or more of the turbines driving the secondary machines may be utilized for preheating the feed water for the supply to the high pressure turbines, and in this case the supply of steam to such feed-heating turbines may be controlled in accordance with the temperature or other condition of the feed water.

The invention may be carried into practice in various ways, but a preferred arrangement according thereto is illustrated in Figure 1 of the accompanying drawings, whilst Figures 2-4 respectively show detail modifications of this arrangement.

In this arrangement the alternators (not shown) supplying the electrical system are divided into three groups, those of the first or primary group being driven by high pressure steam turbines A, whilst those of the other two groups are driven by lower pressure steam turbines $A^1$ and $A^2$ respectively.

High pressure steam is supplied from boilers to a high pressure main B, from which the turbines A in the primary group are fed, these turbines exhausting into an intermediate pressure main C, from which are fed a group of condensing turbines $A^1$ and a group of feed-heating turbines $A^2$ whose exhaust steam from the main D is utilized for preheating the boiler feed water. Steam from the intermediate pressure main C is transmitted from the power station to be utilized for other purposes, and, if desired, boilers at lower pressure may be employed to augment the supply of steam to the intermediate main C. The supply of steam to each turbine A (or $A^1$ or $A^2$) is controlled by a throttle valve E (or $E^1$ or $E^2$) operated by a reversible governor motor F (or $F^1$ or $F^2$) which is energized preferably from a D. C. source G. The supply of energizing current to the governor motors F $F^1$ $F^2$ and the polarity of such current is controlled partly in accordance with the steam pressure conditions, partly in accordance with the distribution of the electrical load among the individual machines of each group, and partly in accordance with the frequency of the electrical system supplied by the machines.

For controlling the supply of energizing current to the governor motors the arrangement forming the subject of application for Letters Patent of the United States of America Serial No. 271,825 standing in the name of the present applicant and another is preferably employed. In a preferred arrangement described in this specification, a group of synchronizing relays responsive to the relation between a standard frequency and the frequency of the electrical system serves in combination with an arrangement for sharing the load between the individual machines to control the energization of a raise-speed contactor H (or $H^1$ or $H^2$) and a lower-speed contactor J (or $J^1$ or $J^2$) associated with each machine, these two contactors determining the direction of rotation of the governor motor F (or $F^1$ or $F^2$) of the associated machine.

The arrangement of the electrical controlling circuits will now be described. In order to control the frequency of the electrical system a constant-speed motor generator set is provided, comprising a D. C. motor K driving an A. C. generator $K^1$ one side of which is earthed whilst the other is connected to the synchronizing apparatus now to be described. This synchronizing apparatus consists of a synchronizing relay L, an auxiliary synchronizing relay M and an interrupter relay N having a time-lag associated with the lifting but not the falling of its contacts, one side of each of the two synchronizing relays L or M being connected to a mid-point tapping on a resistance $L^1$ or $M^1$. The lead from the A. C. generator $K^1$ is connected to the other side of the auxiliary synchronizing relay M and to one side of the resistance $L^1$ associated with the synchronizing relay L. The other side of that resistance $L^1$ together with one side of the resistance $M^1$ associated with the auxiliary synchronizing relay M is connected to the leading phase O of the star-connected secondary O $O^1$ $O^2$ of a potential transformer on the electrical system, one phase $O^1$ of this secondary being earthed. The lagging phase $O^2$ of the secondary is connected to the other side of the resistance $M^1$ associated with the auxiliary synchronizing relay M. The other side of the synchronizing relay L is connected to earth through normally open contacts $M^2$ on the auxiliary synchronizing relay, so that it cannot lift its contacts unless the auxiliary synchronizing relay M has already been energized, but when it does so it at once makes its own retaining circuit at contacts $L^2$ so that the fall of its contacts is independent of the fall of the auxiliary synchronizing relay contacts.

The time-lag interrupter relay N is energized from the D. C. source G through normally closed contacts $M^3$ on the auxiliary synchronizing relay M. When the interrupter relay N completes its lift it acts at contacts $N^1$ to break a circuit from the D. C. source G through the normally closed contacts $M^3$ on the auxiliary synchronizing relay M to change-over contacts $L^3$ on the synchronizing relay L, the other sides of which are respectively connected to two speed-control busbars P $P^1$. Thus when the synchronizing relay L is deenergized this circuit leads to the lower-speed busbar $P^1$, whilst when the synchronizing relay contacts are lifted the raise-speed busbar P is connected up.

Each of the three groups of machines is provided with a load-sharing arrangement to ensure the proper distribution of the electrical load among the individual machines of the group. In one convenient load-sharing arrangement (of the kind described in the prior specification above referred to) a relay Q (or $Q^1$ or $Q^2$), preferably of the watt-meter type, associated with each machine is energized differentially in accordance with the load on the associated machine and with the average load on all the machines of the group, each relay Q (or $Q^1$ or $Q^2$) being provided with two sets of interlock contacts controlling the energizing circuits to the raise-speed and lower-speed contacts H J (or $H^1$ $J^1$ or $H^2$ $J^2$) of the associated machine. The interlock contacts are so arranged that both are normally closed, but that one of them opens when the machine is taking too great a load and thus prevents energization of the raise-speed contactor H (or $H^1$ or $H^2$), whilst the other opens when the machine is taking too small a load to prevent energization of the lower-speed contactor J (or $J^1$ or $J^2$).

The intermediate steam pressure main C is provided with a pressure regulator R having contacts controlling the connection of the two speed-control busbars P $P^1$ to the speed-control contactors of the machines in the primary group and in the condensing group. These contacts may be arranged in various ways. Thus in one arrangement (shown in Figure 2) the two speed-control busbars P $P^1$ are directly connected through the load-sharing contacts to the speed-control contactors $H^1$ $J^1$ of the condensing machines, the contacts $R^1$ on the pressure regulator R controlling only the connection to the contactors H J of the primary machines. In this case the contactors $H^1$ $J^1$ of the condensing machines will be operated in accordance with frequency and load requirements, whilst the control of those (H J) of the primary machines will depend also on the intermediate steam pressure, the pressure regulator contacts $R^1$ acting when the pressure is too low to connect up the raise-speed busbar P through the load-sharing contacts to the raise-speed contactors H of the primary machines and when the pressure is too high the lower-speed busbar $P^1$ to the lower-speed contactors J. Alternatively (as shown in Figure 3) there may be a direct connection through the load-sharing contacts between the speed-control busbars P $P^1$ and the contactors H J of the primary machines, the contacts $R^2$ of the pressure regulator R controlling the connection from these busbars to the contactors $H^1$ $J^1$ of the condensing machines.

Preferably as shown in Figure 1 the pressure regulator R has four sets of contacts $R^3$ $R^4$ $R^5$ $R^6$, two of which $R^5$ $R^3$ close when the pressure is high respectively to connect the raise-speed busbar P to the raise-speed contactors $H^1$ of the condensing machines and the lower-speed busbar $P^1$ to the lower-speed contactors J of the primary machines, whilst the other two $R^6$ $R^4$ close when the pressure is low respectively to connect the raise-speed busbar P to the raise-speed contactors H of the primary machines and the lower-speed busbar $P^1$ to the lower-speed contactors $J^1$ of the condensing machines.

The connection of the contactors $H^2$ $J^2$ of the feed-heating machines to the speed-control busbars P $P^1$ is controlled in accordance with the feed-heating requirements. Thus the level of water in the feed-heating tank (indicated at S) may be taken as the criterion, in which case the speed-control circuits may be controlled by contacts $S^2$ on a float $S^1$ in the tank S. Alternatively this control may be effected in accordance with the temperature of the feed water at some point of its passage through the various feed-heating stages, a thermostat or other temperature-responsive contact-making device being employed. In some cases it may be unnecessary to provide any control for the feed-heating machines other than in accordance with frequency and load.

In order to provide for cases where the number of primary machines in commission happens to be insufficient to enable the intermediate pressure to be maintained at the desired value, it is desirable to provide by-pass valves T between the high pressure main B and the intermediate pressure main C. These emergency valves T are preferably opened by means of reversible motors $T^1$ controlled by contactors $T^2$ $T^3$ whose energizing circuits are taken through contacts $U^1$ on a separate pressure regulator U whose setting is below that of the normal regulator R. These circuits must be operative independently of frequency variations and are preferably taken directly through contacts $M^4$ on the auxiliary synchronizing relay M.

The operation of the arrangement will now be described. So long as the frequency of the system is in agreement with the standard frequency, the synchronizing relay contacts $L^2$ $L^3$ will be lifted and the auxiliary synchronizing relay M will be deenergized, so that the interrupter relay contacts $N^1$ are in their lifted position. Under these conditions the two speed-control busbars P $P^1$ are deenergized and the only control operation which can be effective is the opening of the by-pass valves T in the event of an excessive fall in the intermediate pressure.

If now the electrical load conditions change to any considerable extent, the result will be an uneven distribution of the load among the machines and a change in the frequency of the system. Some of the load-sharing relays Q in each group will thus open one or other of their interlock contacts and the normal condition of the synchronizing relays L M will be changed.

The manner of operation of the synchronizing relays can best be described with reference to the rotation of the needle of a rotary synchroscope, which will be assumed to be connected up in the usual manner to indicate the relationship between the two frequencies.

The synchronizing relay L receives its maximum energizing current when the synchroscope needle reaches its synchronizing position, and is set to lift its contacts 50° before that position is reached, these contacts falling 150° after the synchronizing position is passed. The voltage across the operating coil of the auxiliary synchronizing relay M becomes zero 30° after the synchronizing position is reached when the frequency of the system is less than the frequency of the A. C. generator $K^1$ or 30° before the synchronizing position if the system frequency is greater than that of the A. C. generator. This relay M is set to lift its contacts 120° after its zero position is passed, the contacts falling 35° before the zero position is reached. Thus with the system frequency too high the auxiliary relay M will lift its contacts 90° after the synchronizing position and will drop them again 65° before the synchronizing position, so that the contacts $M^2$ will be down during the period when the synchronizing relay L could be energized. The synchronizing relay L therefore remains inoperative so long as the system frequency is too high. On the other hand with the system frequency too low the auxiliary synchronizing relay M will lift its contacts 150° after the synchronizing position and drop them 5° before the synchronizing position, whilst the synchronizing relay contacts will lift 50° before the synchronizing position and fall 150° after the synchronizing position simultaneously with the lifting of the auxiliary synchronizing relay contacts.

If now the change in load conditions has caused the system frequency to be increased, the auxiliary synchronizing relay contacts will repeatedly rise and fall but the synchronizing relay will remain deenergized and will thus prepare the circuit to the lower-speed busbar $P^1$, and to such of the lower-speed contactors as are connected thereto. This circuit is controlled by normally closed contacts $M^3 N^1$ on the auxiliary synchronizing relay M and on the interrupter relay N. If the change in frequency has been large the synchroscope needle will be rotating too fast for the interrupter relay N to operate its contacts, and consequently the energizing current supplied to the lower-speed contactors affected, and therefore also to the corresponding governor motors, will be intermittently interrupted owing to the rise and fall of the auxiliary synchronizing relay contacts $M^3$. Thus the speed of the machines concerned is lowered gradually and the frequency of the system tends to approach the standard frequency. At a predetermined point in the approach to equality of frequencies, the time allowed for the lifting of the interrupter relay contacts $N^1$ becomes sufficient for them to complete their lift before the lifting of the auxiliary synchronizing relay contacts $M^3$, and from then onwards the amount of interruption in the supply of energizing current to the governor motors is increased, so that the approach to synchronism becomes more gradual. Ultimately the state of synchronism is reestablished, the load-sharing devices in the groups concerned having completed their operation of uniformly distributing the load among the individual machines of the group.

In the case when the load change acts to decrease the system frequency, both synchronizing relays L M repeatedly operate but in such a manner that the auxiliary synchronizing relay contacts $M^3$ are never down when the synchronizing relay contacts $L^3$ are down. Thus current is intermittently supplied to the raise-speed busbar P and thence to such raise-speed contactors as are connected thereto. The speed of the machines concerned increases gradually until synchronous conditions are reestablished, the interrupter relay N functioning as before at the appropriate moment.

The determination as to which of the speed-control contactors are connected to the speed-control busbars $P P^1$ is effected partly by the load-sharing relays Q and partly by the pressure regulator R, or in the case of the feed-heating machines by the float $S^1$ or thermostat. Thus if the intermediate pressure changes, as the result either of variation in the auxiliary steam load or of a change in the output of the turbines, the pressure regulator R will operate to determine which of the groups of machines shall be operated by the frequency control apparatus. If the intermediate pressure has fallen, the effect is either to increase the speed and output of the primary machines or to decrease the speed and output of the condensing machines. In either event the effect will be to raise the intermediate steam pressure and to redistribute the electrical load, so that the primary group takes a greater share of the load than before and the condensing group a smaller share, the sharing of the load between individual machines in the group controlled being meanwhile properly completed. An analogous result will be obtained in the case of an increase in the intermediate pressure.

In the event of a large fall in pressure in the intermediate main C, resulting for example from the cutting out on fault of a primary machine, the second pressure regulator U will operate its contacts $U^1$ and thus complete an energizing circuit to the contactors $T^3$ controlling the by-pass valve motors. The supply of energizing current to these contactors, and therefore also to the valve motors $T^1$, is intermittently interrupted by the rise and fall of the auxiliary synchronizing relay contacts $M^4$, and the by-pass valves T will be gradually opened to allow steam to flow directly from the high pressure main B to the intermediate pressure main C to reestablish the desired pressure conditions, these motors being deenergized by limit switches after the pressure has risen sufficiently.

The relay settings previously described have been chosen to allow the apparatus to be used also if desired for controlling the synchronizing and bringing into circuit of an additional machine, but if this is not required a somewhat simpler arrangement (see Figure 4) may be employed in which the resistance $M^1$ associated with the auxiliary synchronizing relay M is omitted, this relay being directly connected between the lead from the A. C. generator $K^1$ and the lagging phase $O^2$ of the potential transformer secondary. With this arrangement the voltage across the auxiliary synchronizing relay M will become zero 60° away from the synchronizing position instead of 30°, and the desired result can be obtained by so adjusting the settings of the two relays L M that the synchronizing relay L lifts its contacts 30° before the synchronizing position and drops them 160° after that position, whilst the auxiliary synchronizing relay M contacts fall 40° before its zero position and lift 100° after the zero position.

It will be appreciated that the above arrangement has been described by way of example only and may be modified in various ways within the scope of the invention. Thus, for example, means other than those described may be employed for frequency control purposes and other forms of load-sharing arrangement may be used for distributing the load between the individual machines of the groups.

What I claim as my invention and desire to secure by Letters Patent is:—

1. In an automatic control system for turbo-alternators, the combination of a group of high pressure turbines, an intermediate pressure receiver into which the high pressure turbines exhaust, a second group of turbines supplied from the intermediate pressure receiver, a primary group of alternators driven by the high pressure turbines, a secondary group of alternators driven by the turbines of the second group, and means whereby the distribution of the electrical load between the two groups of alternators is controlled in accordance with variations in the pressure in the intermediate receiver and with variations in the frequency of the electrical system supplied by the alternators.

2. In an automatic control system for turbo-alternators, the combination of a group of high pressure turbines, an intermediate pressure receiver into which the high pressure turbines exhaust, a second group of turbines supplied from the intermediate pressure receiver, a primary group of alternators driven by the high pressure turbines, a secondary group of alternators driven by the turbines of the second group, means whereby the distribution of the electrical load between the two groups of alternators is controlled in accordance with variations in the pressure in the intermediate receiver, and means for automatically sharing the load between the individual alternators of the primary group and between the individual alternators of the secondary group.

3. In an automatic control system for turbo-alternators, the combination of a group of high pressure turbines, an intermediate pressure receiver into which the high pressure turbines exhaust, a second group of turbines supplied from the intermediate pressure receiver, a primary group of alternators driven by the high pressure turbines, a secondary group of alternators driven by the turbines of the second group, means whereby the distribution of the electrical load between the two groups of alternators is controlled in accordance with variations in the pressure in the intermediate receiver and with variations in the frequency of the electrical system supplied by the alternators, and means for automatically sharing the load between the individual alternators of the primary group and between the individual alternators of the secondary group.

4. In an automatic control system for turbo-alternators, the combination of a group of high pressure turbines, an intermediate pressure receiver into which the high pressure turbines exhaust, a second group of turbines supplied from the intermediate pressure receiver, a primary group of alternators driven by the high pressure turbines, a secondary group of alternators driven by the turbines of the second group, a reversible motor for governing the supply of operating fluid to each turbine, a pressure regulator operated in accordance with the pressure in the intermediate receiver, a contact-making device responsive to the frequency of the electrical system supplied by the alternators, means whereby the pressure regulator and the frequency responsive device together control the supply of energizing current to the reversible motors, and means whereby the supply of such energizing current is intermittently interrupted, the extent of the interruptions being dependent on the variation of the system frequency from a standard value.

5. In an automatic control system for turbo-alternators, the combination of a group of high pressure turbines, an intermediate pressure receiver into which the high pressure turbines exhaust, a second group of turbines supplied from the intermediate pressure receiver, a primary group of alternators driven by the high pressure turbines, a secondary group of alternators driven by the turbines of the second group, means whereby the distribution of the electrical load between the two groups of alternators is controlled in accordance with variations in the pressure in the intermediate receiver, and with variations in the frequency of the electrical system supplied by the alternators, means for automatically sharing the load between the individual alternators of the primary group and between the individual alternators of the secondary group, normally closed by-pass valves between the intermediate receiver and the high pressure supply to the turbines of the primary group, and means for automatically opening such valves when the pressure in the intermediate receiver falls below a predetermined value.

6. In an automatic control system for turbo-alternators, the combination of a group of high pressure steam turbines, an intermediate pressure receiver into which the high pressure turbines exhaust, a second group of steam turbines supplied with steam from the intermediate pressure receiver, means for generating high pressure steam for supply to the first group of turbines, a feed water supply to the steam generating means, means whereby the exhaust steam from some of the turbines of the second group is utilized for preheating the feed water, a primary group of alternators driven by the high pressure turbines, a secondary group of alternators driven by the turbines of the second group, means whereby the supply of steam to the feed-heating turbines is controlled in accordance with the condition of the feed water supply, and means whereby the supply of steam to the turbines of the first group and to the remaining turbines of the second group is controlled in accordance with variations in the pressure in the intermediate receiver.

7. In an automatic control system for turbo-alternators, the combination of a group of high pressure steam turbines, an intermediate pressure receiver into which the high pressure turbines exhaust, a second group of steam turbines supplied with steam from the intermediate pressure receiver, means for generating high pressure steam for supply to the first group of turbines, a feed water supply to the steam generating means, means whereby the exhaust steam from some of the turbines of the second group is utilized for preheating the feed water, a primary group of alternators driven by the high pressure turbines, a secondary group of alternators driven by the turbines of the second group, a contact-making device responsive to the frequency of the system supplied by the alternators, a contact-making device responsive to the condition of the feed water supply, means whereby such contact-making devices control the supply of steam to the feed-heating turbines, a pressure regulator operated in accordance with the steam pressure in the intermediate receiver, and means whereby the pressure regulator and the frequency responsive device control the supply of steam to the turbines of the first group and to the remaining turbines of the second group.

In testimony whereof I have signed my name to this specification.

THOMAS REGINALD WARREN.